(12) United States Patent
Grund

(10) Patent No.: US 6,455,797 B1
(45) Date of Patent: Sep. 24, 2002

(54) DEVICE AND METHOD FOR SORTING PIECE GOODS

(75) Inventor: Hans-Joachim Grund, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/806,241
(22) PCT Filed: Sep. 21, 1999
(86) PCT No.: PCT/DE99/03009
§ 371 (c)(1), (2), (4) Date: May 22, 2001
(87) PCT Pub. No.: WO00/18668
PCT Pub. Date: Apr. 6, 2000

(30) Foreign Application Priority Data

Sep. 28, 1998 (DE) .......... 198 44 478

(51) Int. Cl.⁷ .............. B07C 5/00; B65G 47/10
(52) U.S. Cl. .......... 209/583; 209/707; 209/912; 198/357; 198/358; 198/370.04
(58) Field of Search .......... 209/559, 562, 209/563, 564, 583, 911, 912, 707; 198/370.04, 357, 358

(56) References Cited

U.S. PATENT DOCUMENTS 5,335,767 A 8/1994 Killer et al. ............ 209/900 X
5,642,802 A 7/1997 Maier et al. ........... 198/370.04
5,860,504 A * 1/1999 Lazzarotti ................ 198/357
6,129,199 A * 10/2000 Gretener et al. .... 198/370.04 X

FOREIGN PATENT DOCUMENTS

| EP | 0 343 613 | 11/1989 | |
| EP | 0 366 857 | 5/1990 | |
| EP | 0 700 844 A2 | 3/1996 | |
| JP | 5-043037 | * 2/1993 | ................ 198/357 |

OTHER PUBLICATIONS

Tilt–Tray Sorting System, S–2000, Crisplant a/s.

* cited by examiner

Primary Examiner—Tuan N. Nguyen
(74) Attorney, Agent, or Firm—Venable; Robert Kinberg

(57) ABSTRACT

Piece goods are sorted with tilting tray sorters by recognizing when a large good needs two consecutive empty tilting trays in order to be inwardly transferred; locating a first, empty tilting tray; emptying a second tilting tray occupied by a good adjacent to the first empty tilting tray prior to the inward transfer of the large good, thereby resulting in two adjacent empty tilting trays; inwardly transferring the large good requiring two tilting trays to the two adjacent empty tilting trays; and transferring the outwardly removed good inward to a third empty tilting tray.

3 Claims, 4 Drawing Sheets

DEVICE AND METHOD FOR SORTING PIECE GOODS

BACKGROUND OF THE INVENTION

Field of the Invention

The invention relates to a device and method for sorting goods of different shapes and sizes.

Related Art

With known tilting-tray sorters, the tilting trays are not sized according to the largest goods, but such that the achievable throughput and the share of the goods occupying two tilting trays are optimally matched to each other.

Prior to the inward transfer of a good (an item) needing two tilting trays, the control must always reserve two consecutive trays. This can be achieved satisfactorily only if the inward transfer locations are positioned close to each other and the goods to be transferred inward at this location can be seen adequately ahead of time. This is explained further in FIG. 1.

A sorter S with an inward transfer region, having 5 inward transfer locations E1–E5, is shown schematically herein. One inward transfer operation is immediately followed by another one at a distance of 2–3 tilting trays. The arrows characterize the complete inward transfer line with a corresponding transporting unit. The occupation algorithm for the tilting trays in that case can fall back on the occupation of all inward transfer lines. It is assumed that an empty tilting tray is located at position B of the sorter S at a specific point in time. That empty tilting tray is reserved for the inward transfer at inward transfer location E1–5. Moving a tilting tray from position B to the respective inward transfer position requires the same amount of time as does moving a good (item) on the respective inward transfer line from a position, fixed by the timeline Z, to the inward transfer position. All goods, which at the point in time when the tilting tray to be reserved passes the position B, are conveyed along the inward transfer lines in the direction of the inward transfer position and are closer to the inward transfer position than the positions marked by the line Z. Therefore, the goods can be included in the decision as to which goods must first be transferred outward.

Since the position and size of these goods are known, it is possible to reserve two successive, empty tilting trays for large goods by taking into consideration the flow of goods on the sorting path and the goods on all inward transfer lines. However, in many cases, the compact grouping of the inward transfer locations is not possible. The causes for this can be either structural conditions or facilities with several main sorters and presorters and a freely selectable path for the goods from one optional inward transfer location to each outward transfer location. As a result of inward transfer locations that are spaced far apart, it is no longer possible to reserve tilting trays ahead of time, especially for large goods, since the goods on the upstream positioned inward transfer lines are not known from the view of the reserving point. This is demonstrated well in FIG. 2.

In this Figure, the inward transfer locations E1 and E5 with their inward transfer lines are positioned far enough apart, so that a tilting tray that passes the position B cannot yet be reserved for the inward transfer location E5. This is due to the fact that whether a large good for two tilting trays must be transferred inward is not known at that instant in time. In the drawing, the length of the inward transfer line represents the time from the good takeup to the inward transfer moment. Since the time line Z does not intersect the inward transfer line for the inward transfer location E5, a reservation is not possible. Thus, it is difficult to find two successive, empty tilting trays for large goods on the inward transfer line. Subsequent goods also cannot be transferred inward in that case. Individual tilting trays would pass by this inward transfer location E5 while empty, which would result in a reduction of the throughput. Until now, two successive, empty tilting trays were reserved as a precaution, which could not satisfactorily solve the problem because it could not be ensured that two empty tilting trays were available at the correct moment.

SUMMARY OF THE INVENTION

It is therefore the object of the invention to improve the inward transfer of large goods requiring two tilting trays in tilting tray sorters by providing two empty, successive tilting trays at the correct time, thus avoiding throughput losses.

The invention proceeds on the assumption that if only one empty tilting tray is available, a neighboring tilting tray with a good is emptied, so that a large good can be transferred inward. The outward transferred good from the neighboring tray is then again transferred inward to an individual, empty tilting tray downstream of the inward transfer location. As a result, a view of all inward transfer lines ahead of time is no longer necessary and the inward transfer algorithm is simplified.

In one exemplary embodiment, the present invention can be a device for sorting goods which can include circulating tilting trays, inward transfer locations for loading the tilting trays, and outward transfer locations for unloading into collecting bins for correct sorting. The outward transfer locations can include sensors for determining the loading condition of the tilting trays. The device can also include means for reading and recording distribution information, and a control unit for controlling the sorting operations based on the recorded information. The control unit can include an additional outward transfer location located in front of an inward transfer location for the outward transfer of goods located on a single tilting tray onto a joint transport path, where the joint transfer path has an intermediate storage area which is operated in a start-stop mode. The control unit can also include an additional inward transfer location disposed at an end of the joint transport path. If the control unit determines that only one empty tilting tray is available for a good which requires two tilting trays in order for the two tilting tray good to be transferred inward, a second good in a tilting tray adjacent and upstream to the one empty tilting tray is transferred outward via the additional outward transfer location so that the two tilting tray good is then transferred inward on the now available, side-by-side arranged empty tilting trays. The second good which was transferred outward via the additional outward transfer location, is again transferred inward via the joint transport path, and the additional inward transfer location, to an individual, empty tilting tray.

In another exemplary embodiment, the present invention can be a method for sorting piece goods by means of tilting tray sorters, having the steps of recognizing when a large good needs two consecutive empty tilting trays in order to be transferred inwardly, locating an empty tilting tray, emptying a tilting tray occupied by a good adjacent to the empty tilting tray prior to the inward transfer of the large good, transferring the large good requiring two tilting trays to the two empty, successively following tilting trays, and transferring the additional, removed good inward to a single, empty tilting tray.

In another exemplary embodiment, the present invention can be an apparatus for sorting goods having multiple means for holding goods, multiple means for loading the goods into the holding means, multiple means for unloading the goods into collecting means for correct sorting, where the unloading means has means for determining the loading condition of the holding means, means for reading and recording distribution information, and means for controlling sorting operations based on the recorded distribution information. The controlling means can have additional unloading means located in front of at least one of the loading means for the outward transfer of goods onto a joint transport path, where the goods are located on one of the holding means, the joint transfer path has an intermediate storage area which is operated in a start-stop mode, and the transport path ends in an additional loading means. If the controlling means determines that only one of the holding means is empty for a good which requires two of the holding means in order to be transferred inward, the good in one of the holding means adjacent to the empty holding means is transferred outward via the additional unloading means, the good needing two of the holding means is then transferred inward on the now available, side-by-side arranged empty two of the holding means; and the outwardly transferred good is again transferred inward via the transport path and the additional loading means to an empty holding means.

The invention is explained in the following with further detail and with the aid of drawings.

DETAILED DESCRIPTION OF THE INVENTION

Figure 1:
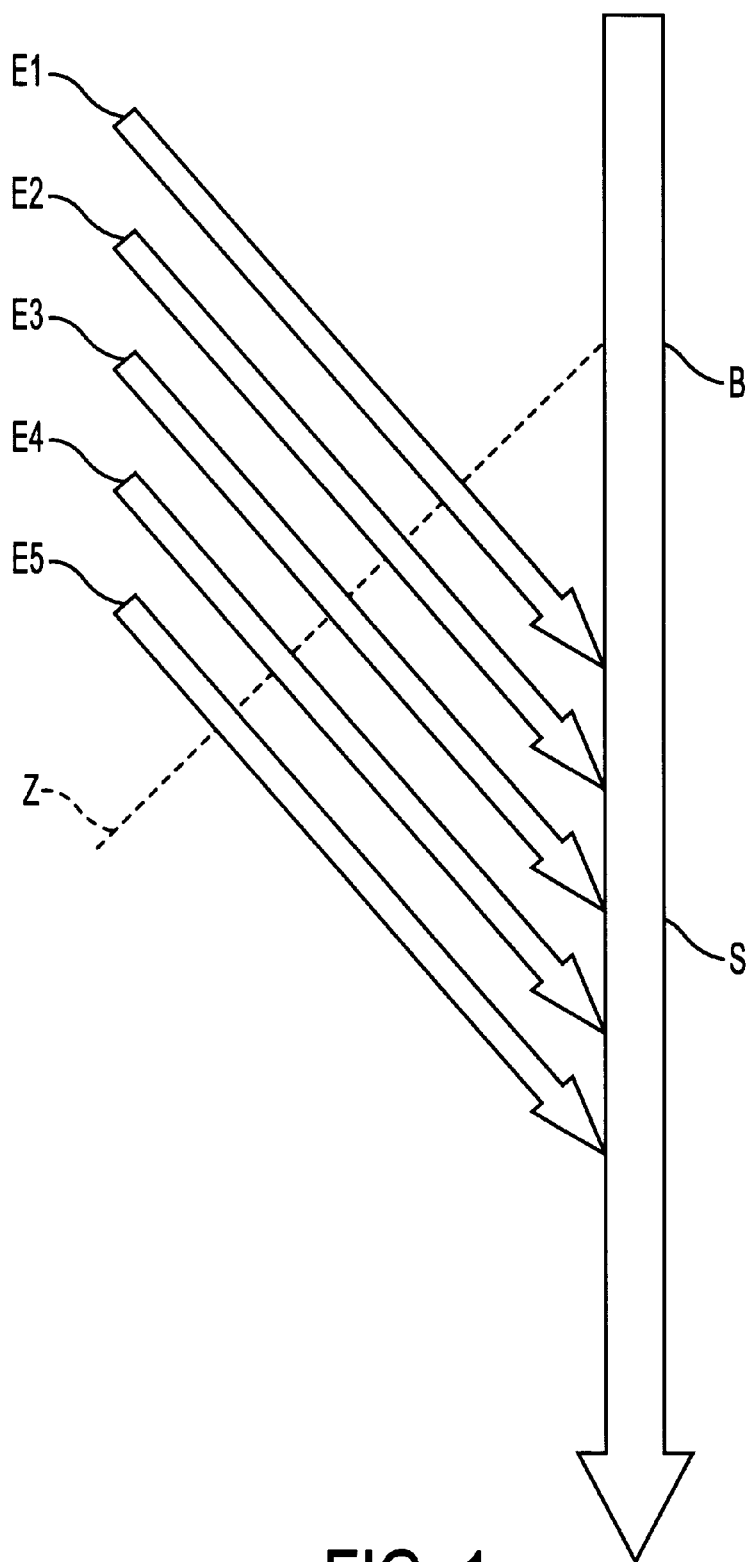
FIG. 1 shows a schematic representation of an inward transfer region with five side-by-side arranged inward transfer locations according to prior art.
Figure 2:
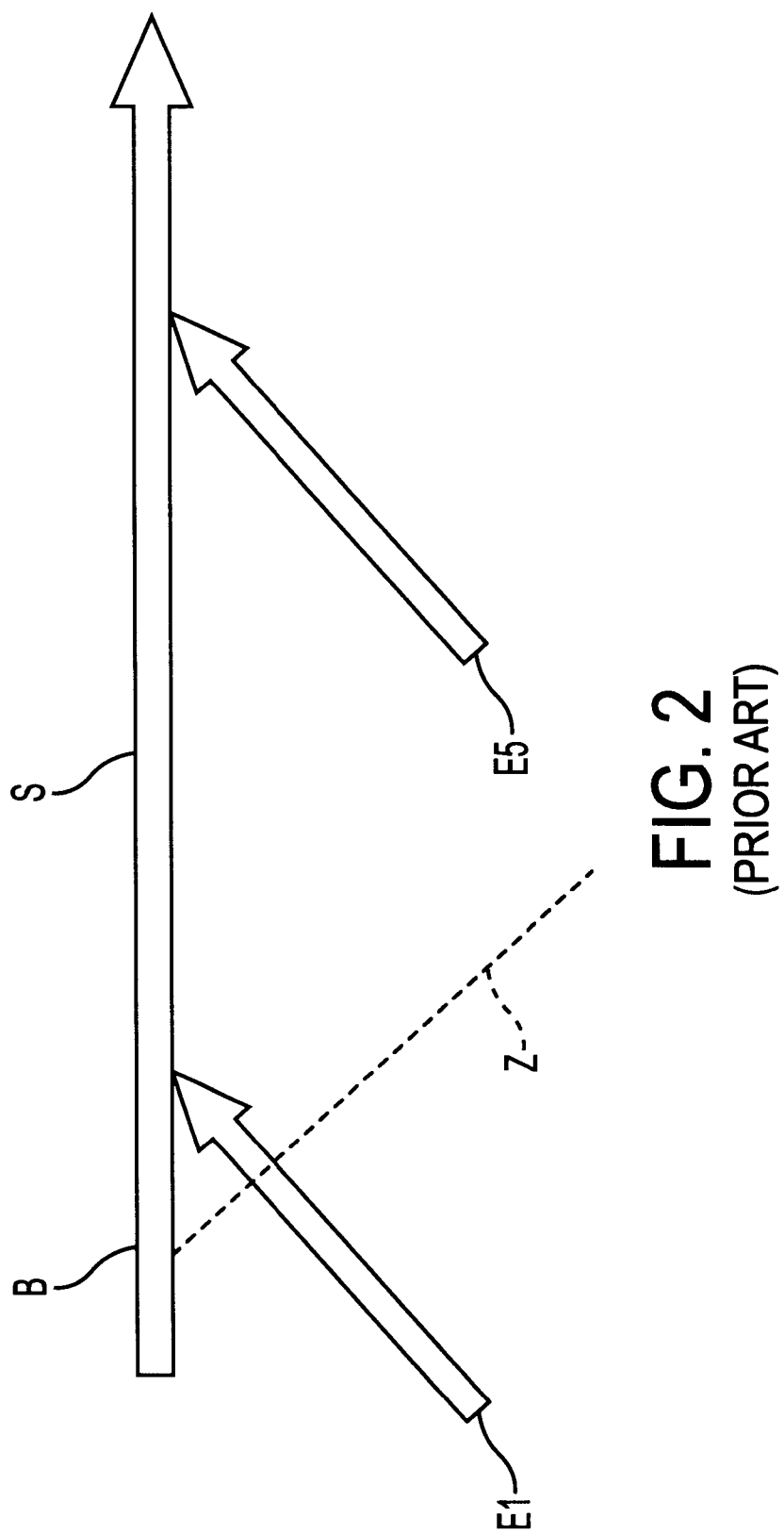
FIG. 2 depicts a schematic representation of two inward transfer locations according to prior art, which are spaced far apart.
Figure 3:
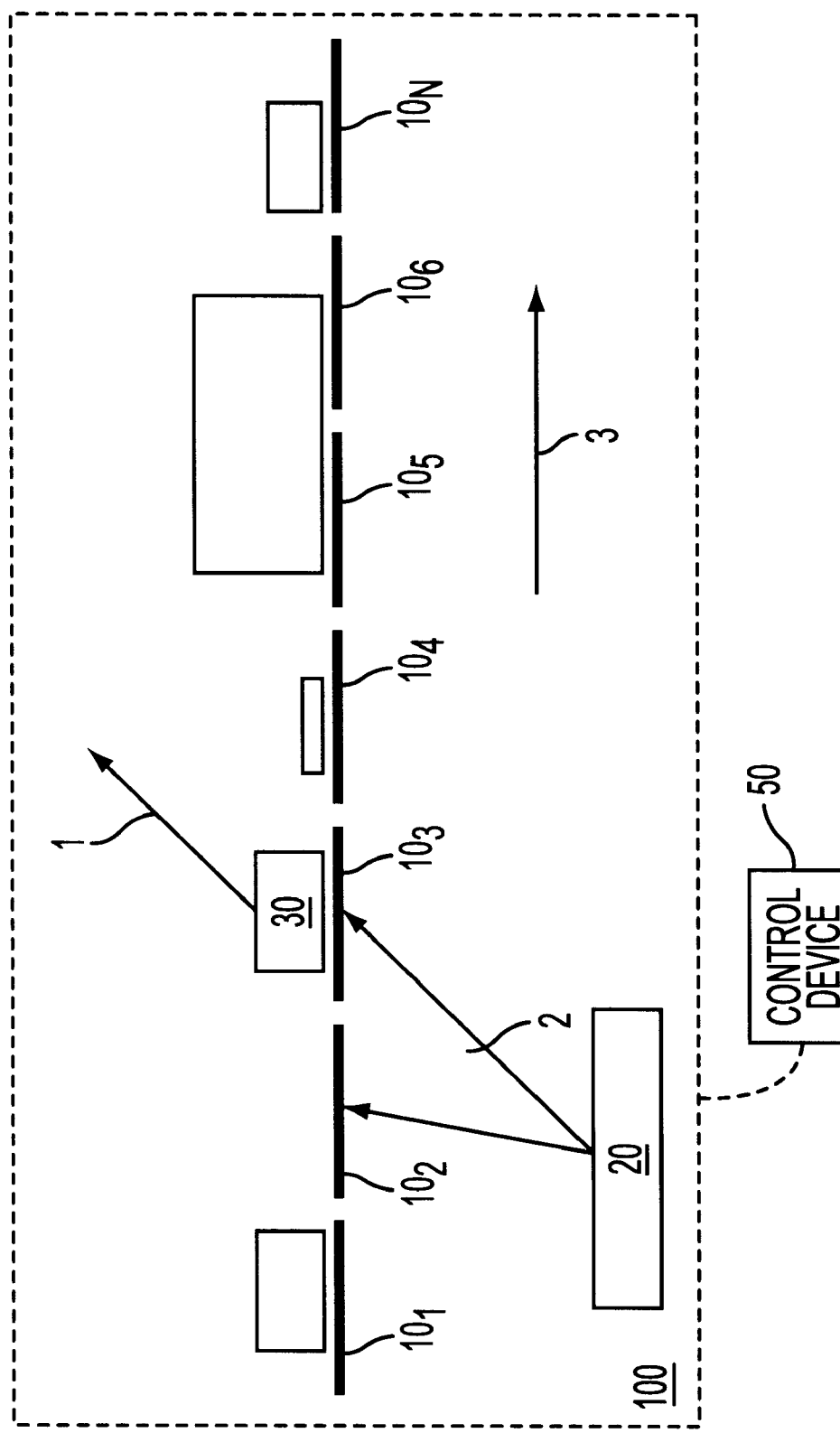
FIG. 3 illustrates a schematic representation of the inward transfer of a large good according to the present invention.

The sequence according to the invention is explained and shown in FIG. 3. The tilting trays $10_1$–$10_N$ move from the left to the right. A large-sized package 20 is to be transferred inward at the location shown by arrows 2. Since only one tilting tray ($10_2$) is empty, the normal-sized package 30 in the adjacent tilting tray ($10_3$), positioned in front as seen in the transport direction 3, is transferred outwardly shortly before the inward transfer and in front of the inward transfer location, as indicated by the arrow 1. The decision concerning a required, additional outward transfer is made in the control device 50 for the tilting tray sorter 100, based on the area immediately surrounding the respective inward transfer location. It is not necessary to know the occupation status of the inward transfer lines, located upstream in the transporting direction, so that only a very simple control algorithm is required for this.

Figure 4:
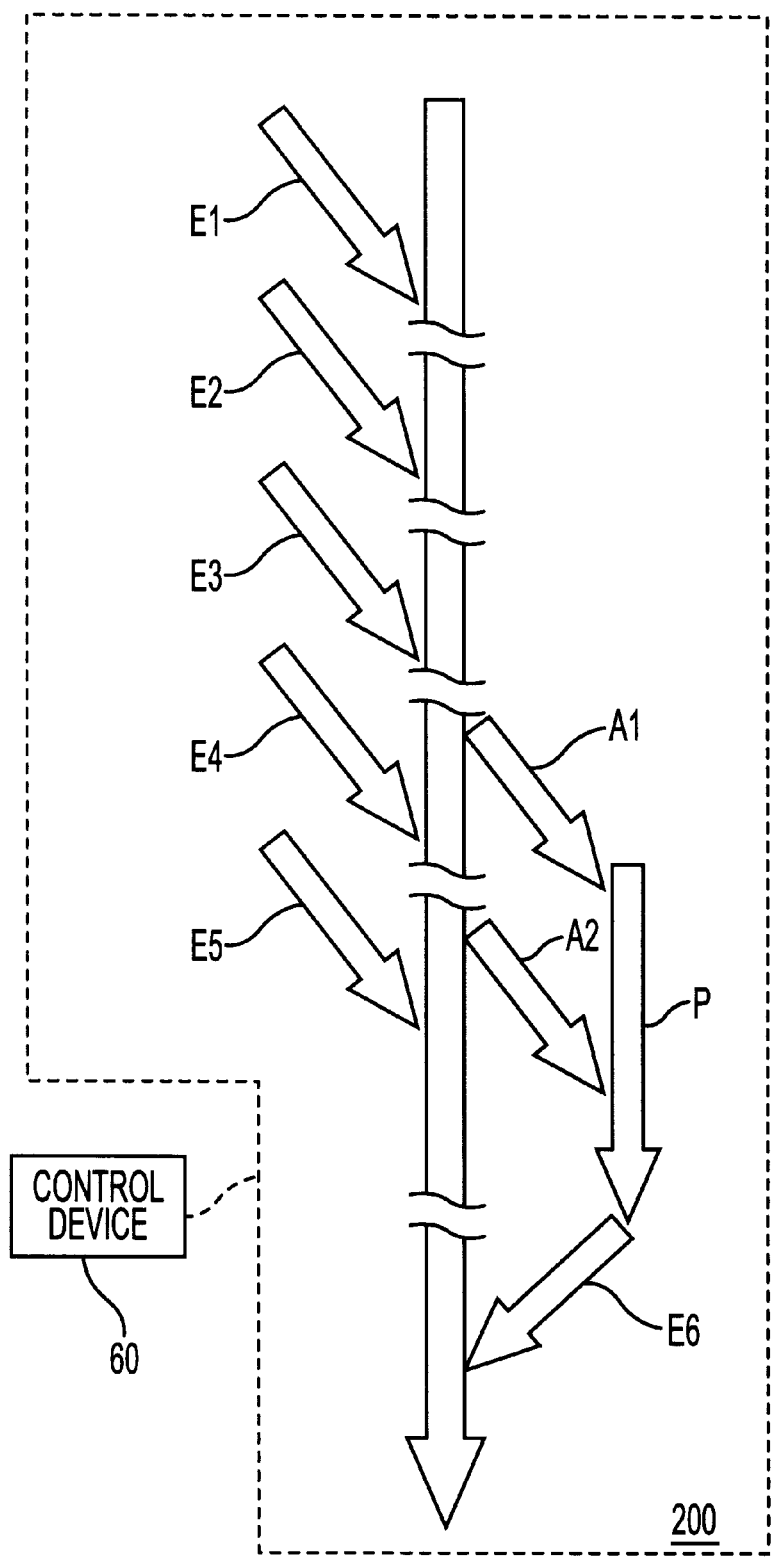
FIG. 4 shows a schematic representation of five inward transfer locations and two outward transfer locations according to the invention, including an additional inward transfer according to the present invention.

FIG. 4 schematically shows five additional inward transfer locations E1–E5, which are spaced far apart in another embodiment of a tilting tray sorter 200 coupled to a control device 60. Additional outward transfer locations A1 and A2 are located only in front of the two last inward transfer locations E4 and E5 because only at those locations is the occupation rate high enough to make it worthwhile to use this measure. From the additional outward transfer locations A1 and A2 with their outward transfer lines, the normal-sized packages 30 are conveyed to a joint transporting path with intermediate storage P. From there, they are again moved to an empty tilting tray via an additional inward transfer location E6. This intermediate storage P consists of at least one region operated in the start-stop mode. The number of intermediate storage stages is therefore selected based on the number of packages (goods), such that a backup is avoided or that load peaks can be compensated. It is understood that other types of goods, such as boxes or sacks, can be processed in place of the packages.

What is claimed is:

1. A method for sorting piece goods by means of tilting tray sorters, comprising the steps of:

recognizing when a large good needs two consecutive empty tilting trays in order to be inwardly transferred;

locating a first, empty tilting tray;

emptying a second tilting tray occupied by a good adjacent to said first empty tilting tray prior to the inward transfer of said large good, thereby resulting in two adjacent empty tilting trays;

inwardly transferring said large good requiring two tilting trays to the two adjacent empty tilting trays; and transferring the outwardly removed good inward to a third empty tilting tray.

2. An apparatus for sorting goods comprising:

a plurality of means for holding goods;

a plurality of means for loading said goods into said holding means;

a plurality of means for unloading said goods from said holding means into collecting means for correct sorting of the goods, said unloading means further comprising sensing means for determining the loaded condition of said holding means;

means for reading and recording information about the distribution of said goods in the holding means; and means for controlling sorting operations based on said recorded distribution information, said controlling means further comprising:

an additional unloading means is located in front of at least one of said loading means for outward transfer of goods onto a joint transport path, said goods being located on one of said holding means, and the joint transport path having an intermediate storage area which is operated in a start-stop mode;

an additional loading means disposed at an end of the joint transport path;

wherein, if the controlling means determines that only one of said holding means is empty for a good which requires two of said holding means in order to be transferred inward, a good in one of said holding means adjacent and upstream to said empty holding means is transferred outward via the additional unloading means, resulting in side-by-side empty two of said holding means;

the good needing two of said holding means is then transferred inward on the side-by-side empty two of said holding means; and the good, transferred outward via the additional unloading means, is transferred inward via the joint transport path and the additional loading means to a third empty one of said holding means.

3. A device for sorting goods comprising:

circulating tilting trays;

inward transfer locations for loading said tilting trays;

outward transfer locations for unloading into collecting bins for correct sorting, said outward transfer locations further comprising sensors for determining the loading condition of the tilting trays;

means for reading and recording information about the distribution of goods in the tilting trays; and a control unit for controlling sorting operations of the collecting bins based on the recorded distribution information, the control unit further comprising:

an additional outward transfer location located in front of at least one inward transfer location for the outward transfer of goods located on only one tilting tray onto a joint transport path, the joint transport path having an intermediate storage area which is operated in a start-stop mode;

an additional inward transfer location disposed at an end of the joint transport path;

wherein, if the control unit determines that only one empty tilting tray is available for a good which requires two tilting trays in order for the two tilting tray good to be transferred inward, a second good in a tilting tray adjacent and upstream to the one empty tilting tray is transferred outward via the additional outward transfer location so that the two tilting tray good is then transferred inward on the now available, side-by-side arranged empty tilting trays; and wherein the second good, transferred outward via the additional outward transfer location, is again transferred inward via the joint transport path, and the additional inward transfer location, to an individual, empty tilting tray.

* * * * *